United States Patent
Hongu et al.

(10) Patent No.: US 8,723,081 B2
(45) Date of Patent: May 13, 2014

(54) WELDING OUTPUT CONTROL METHOD AND ARC WELDING EQUIPMENT

(75) Inventors: Toshinori Hongu, Hyogo (JP); Kazunori Matsumoto, Osaka (JP); Kimiya Satou, Hyogo (JP); Yoshiaki Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 871 days.

(21) Appl. No.: 12/064,142

(22) PCT Filed: Aug. 3, 2007

(86) PCT No.: PCT/JP2007/065225
§ 371 (c)(1),
(2), (4) Date: Feb. 19, 2008

(87) PCT Pub. No.: WO2008/105116
PCT Pub. Date: Sep. 4, 2008

(65) Prior Publication Data
US 2010/0176105 A1    Jul. 15, 2010

(30) Foreign Application Priority Data
Feb. 28, 2007 (JP) .................................. 2007-048750

(51) Int. Cl.
*B23K 9/09* (2006.01)
(52) U.S. Cl.
USPC ............ 219/130.51; 219/130.33; 219/137 PS
(58) Field of Classification Search
USPC ............... 219/121.11, 130.01, 130.1, 130.21, 219/130.31, 130.33, 130.5, 130.51, 136, 219/137 R, 137 PS
See application file for complete search history.

(56) References Cited

U.S. PATENT DOCUMENTS

| | | | | | |
|---|---|---|---|---|---|
| 3,893,013 | A | * | 7/1975 | Mironoff | 219/69.13 |
| 4,553,018 | A | * | 11/1985 | Kondo et al. | 219/130.51 |
| 6,025,573 | A | * | 2/2000 | Stava | 219/130.21 |
| 6,087,627 | A | * | 7/2000 | Kramer | 219/130.21 |

FOREIGN PATENT DOCUMENTS

| | | |
|---|---|---|
| JP | 59-202173 A | 11/1984 |
| JP | 60-145278 A | 7/1985 |
| JP | 02-059176 A | 2/1990 |

OTHER PUBLICATIONS

International Search Report for PCT/JP2007/065225, dated Nov. 13, 2007.

* cited by examiner

*Primary Examiner* — Brian Jennison
(74) *Attorney, Agent, or Firm* — RatnerPrestia

(57) ABSTRACT

A superimposed voltage waveform with a predetermined cycle and amplitude is superimposed on a commanded voltage waveform for a second predetermined time after a first predetermined time elapses within an arcing period in which an arc is produced. The predetermined cycle of the superimposed voltage waveform is shorter than a short-circuit cycle and longer than a control cycle of a welding power supply unit. This suppresses a growth of a weld droplet by being pushed up toward a consumable electrode and suppresses an excessive growth of the droplet over an entire range from a low current range, characterized by frequent short-circuits, to a medium to high current range where short-circuits are less frequent. The droplet is also smoothly transferred to the weld pool in addition to preventing excessive droplet growth. This reduces the generation of spatter, giving a flatter bead appearance.

19 Claims, 10 Drawing Sheets

WELDING OUTPUT CONTROL METHOD AND ARC WELDING EQUIPMENT

This application is a U.S. National Phase Application of PCT International Application PCT/JP2007/065225.

TECHNICAL FIELD

The present invention relates to arc welding using a consumable electrode that carries out welding by feeding a consumable electrode and alternating between short-circuiting and arcing. In particular, the present invention relates to welding output control methods and arc welding equipment that superimpose a predetermined voltage waveform on a commanded welding voltage during an arcing period.

BACKGROUND ART

A higher welding quality including better bead appearance and weld penetration shape, combined with reduced spatter, are increasingly in demand. Less generation of spatter, in particular, is needed to improve welding quality and minimize adhesion of spatter to jigs and tools, which in turn will increase maintenance efficiency and lead to a better working environment.

Analysis of the spatter generation mechanism, typically using high-speed cameras, has revealed that spatter generation timing can be divided into two main periods: a short-circuiting period and an arcing period. A conventional spatter reduction method during the arcing period is to output a high current or a rated voltage that causes a high current during a predetermined time immediately after arcing, following which, during the latter part of the arcing period, a low current is output. (See Patent Document 1.) Another known method is to detect a change in the voltage output waveform during the arcing period to predict short-circuiting, and to output a low current if a significant change is detected. (See Patent Document 2.)

In prior arts, the pushing up of a weld droplet toward the consumable electrode by arc force and the separation of a large spatter droplet are reduced by outputting a low current when the molten metal formed at the tip of the consumable electrode (hereafter referred to as the "droplet") and the molten metal (hereafter referred to as the "weld pool") formed on a welding workpiece cause a short-circuit. However, this generation of the short-circuit is unpredictable. Therefore, once the current output is reduced, the longer the time until the next short-circuit, the smaller the size of the area that is thermally affected by arcing. The result, if much time elapses, is the tendency to form an undesirably convex bead. This is unpreferrable bead appearance. In addition, the spatter reduction effect decreases when welding in the medium to high current range where short-circuits are less frequent.

In the method of predicting the generation of the short-circuit, the distance between the weld droplet and weld pool needs to be small. However, even if a signal indicating an imminent short-circuit is generated, an excessive arc force is applied between the droplet and weld pool at the time of detection because arc is concentrated. In this case, the droplet becomes separated in the form of a large spatter droplet, or is pushed up by the arc force. If the droplet is pushed up, it takes a long time for the droplet to extend downwards and cause the short-circuit, resulting in an excessively large droplet. This also causes a large spatter droplet.

Patent Document 1: Japanese Patent Unexamined Publication No. S59-202173.

Patent Document 2: Japanese Patent Unexamined Publication No. S60-145278.

SUMMARY OF THE INVENTION

A welding output control method of the present invention is for arc welding using a consumable electrode that carries out welding by feeding the consumable electrode to a welding workpiece and supplying power between the consumable electrode and the welding workpiece by a welding power supply unit so as to alternate between a short-circuiting period and an arcing period. During a predetermined period within the arcing period, a predetermined superimposed voltage waveform, which is shorter than a short-circuit cycle and longer than a control cycle of the welding power supply unit, is superimposed on a commanded voltage waveform.

With this configuration, vibration of a weld droplet and weld pool can be suppressed or forcibly created by periodically changing the arc force. This enables suppression of the growth of the droplet by being pushed up toward the consumable electrode over an entire range from a low current range, characterized by frequent short-circuits, to a medium to high current range where short-circuits are less frequent. The droplet is also smoothly transferred to the weld pool in addition to preventing excessive droplet growth. This reduces the generation of spatter, giving a flatter bead appearance.

Arc welding equipment of the present invention is for arc welding using a consumable electrode that carries out welding by feeding the consumable electrode so as to alternate between the short-circuiting period and the arcing period. The arc welding equipment includes a welding voltage detector for detecting a welding output voltage, a reference voltage waveform generator for generating a reference voltage waveform during the arcing period, and a short-circuit and arc determination unit for determining whether a welding state is in the short-circuiting period or the arcing period, based on an output signal of the welding voltage detector. The arc welding equipment also includes a first timer for measuring a first predetermined time after an output signal of the short-circuit and arc determination unit determines the arcing period, a second timer for measuring a second predetermined time after the measurement by the first timer is completed, and a superimposed voltage waveform generator for generating and outputting a predetermined superimposed voltage waveform, set in advance, when an output signal of the second timer reports the measurement state. The arc welding equipment further includes a voltage waveform synthesizer for combining an output signal of the reference voltage waveform generator and an output signal of the superimposed voltage waveform generator, and a controller for controlling a welding output based on an output signal of the voltage waveform synthesizer and an output signal of the welding voltage detector.

Furthermore, the arc welding equipment of the present invention is for arc welding using a consumable electrode that carries out welding by feeding the consumable electrode so as to alternate between the short-circuiting period and the arcing period. The arc welding equipment includes the welding voltage detector for detecting the welding output voltage, the reference voltage waveform generator for generating the reference voltage waveform during the arcing period, and the short-circuit and arc determination unit for determining whether the welding state is in the short-circuiting period or the arcing period based on the output signal of the welding voltage detector. The arc welding equipment also includes a first threshold determination unit for determining whether or not the reference voltage waveform is not greater than a first threshold, a second threshold determination unit for determining whether or not a commanded voltage waveform is not greater than a second threshold, and the superimposed voltage waveform generator for generating and outputting the predetermined superimposed voltage waveform, set in advance, while the reference voltage waveform is between a first threshold and a second threshold after an output signal of the short-circuit and arc determination unit determines the arcing period. The arc welding equipment further includes the voltage waveform synthesizer for combining the output signal of the reference voltage waveform generator and the output signal of the superimposed voltage waveform generator, and a controller for controlling the welding output based on the output signal of the voltage waveform synthesizer and the output signal of the welding voltage detector.

REFERENCE MARKS IN THE DRAWINGS

Figure 1:
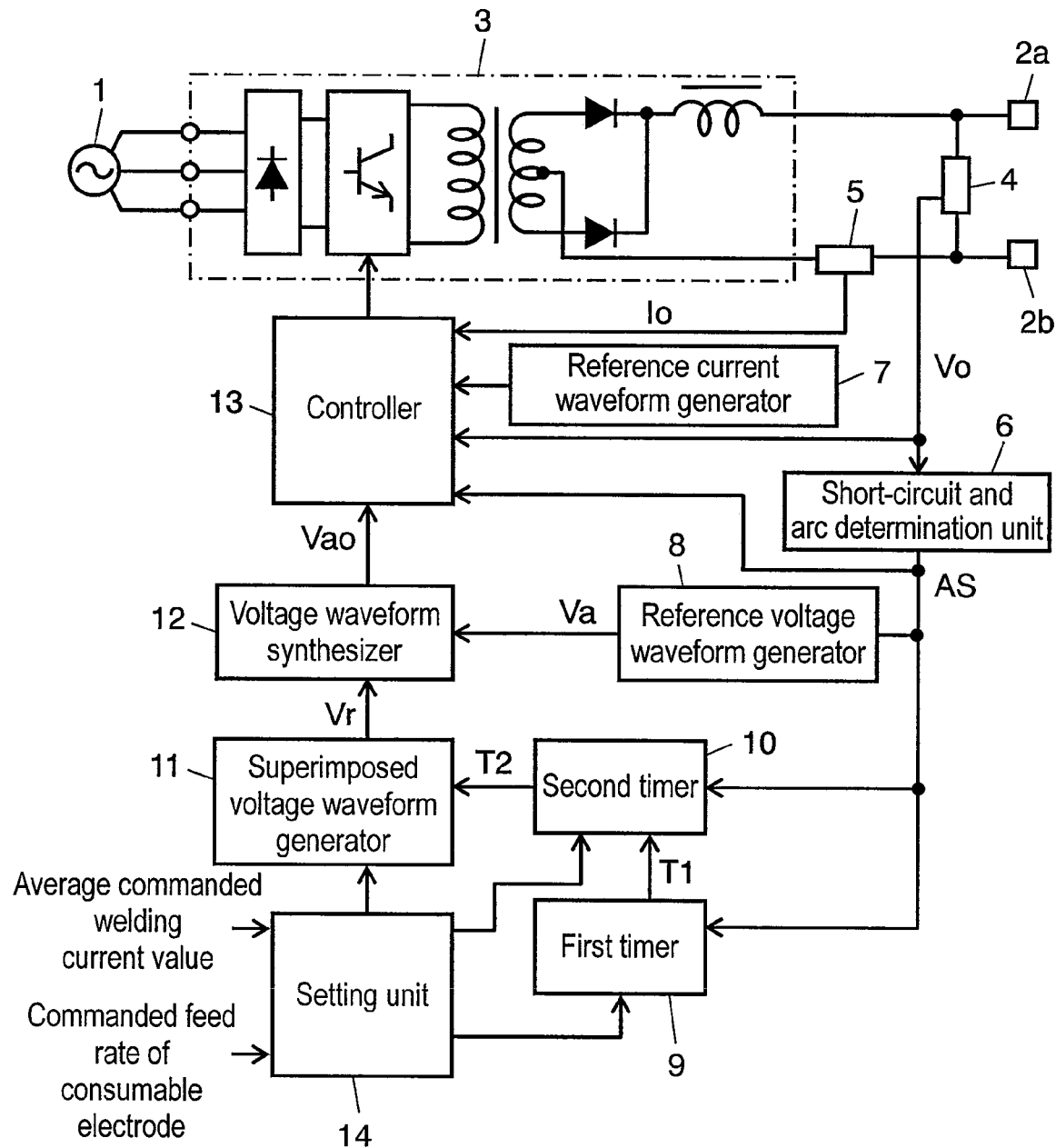
FIG. 1 is a block diagram illustrating a configuration of arc welding equipment in accordance with a first exemplary embodiment of the present invention.

1 Input power supply
2a Output end
2b Output end
3 Welding output unit
4 Welding voltage detector
5 Welding current detector
6 Short-circuit and arc determination unit
7 Reference current waveform generator
8 Reference voltage waveform generator
9 First timer
10 Second timer
11 Superimposed voltage waveform generator
12 Voltage waveform synthesizer
13 Controller
14 Setting unit
15 First threshold determination unit
16 Second threshold determination unit
17 Setting unit

DETAILED DESCRIPTION OF PREFERRED EMBODIMENTS

Exemplary embodiments of the present invention are described below with reference to drawings.

First Exemplary Embodiment

FIG. 1 is a block diagram illustrating a configuration of arc welding equipment in the first exemplary embodiment of the present invention. As shown in FIG. 1, the arc welding equipment in this exemplary embodiment includes input power supply 1, output end 2a and output end 2b on the welding equipment, welding output unit 3, welding voltage detector 4, and welding current detector 5. The arc welding equipment also includes a short-circuit and arc determination unit 6 for determining whether the welding state is in a short-circuiting state or arcing state based on an output of welding voltage detector 4, reference current waveform generator 7 for generating a reference current waveform during a short-circuiting period, and reference voltage waveform generator 8 for generating a reference voltage waveform during an arcing period. The arc welding equipment further includes first timer 9 for measuring a first predetermined time after an arc is produced, based on an output of the short-circuit and arc determination unit 6; second timer 10 for measuring a second predetermined time based on an output of the first timer; and superimposed voltage waveform generator 11 for generating a predetermined superimposed voltage waveform that is shorter than a short-circuit cycle and longer than a control cycle of a welding power supply unit. Further, the arc welding equipment includes voltage waveform synthesizer 12 for generating a welding output waveform based on outputs of reference voltage waveform generator 8 and superimposed voltage waveform generator 11, and controller 13 for controlling a welding output based on the outputs of short-circuit and arc determination unit 6, welding current detector 5, reference current waveform generator 7, welding voltage detector 4, and voltage waveform synthesizer 12. Furthermore, the arc welding equipment includes setting unit 14 for storing and setting the first predetermined time, the second predetermined time, and a periodic waveform of the superimposed voltage waveform, based on an average commanded welding current value or a commanded feed rate of the consumable electrode.

Although not illustrated in the drawing, the consumable electrode is electrically connected to either output end 2a or output end 2b, and a welding workpiece is electrically connected to the remaining free output end 2a or 2b. The consumable electrode is fed to the welding workpiece, and the welding power supply unit supplies power between the consumable electrode and the welding workpiece so as to produce an arc for welding. The arc welding equipment adopts a welding output control method for arc welding using the consumable electrode in which the short-circuiting period and arcing period are alternated.

Figure 2:
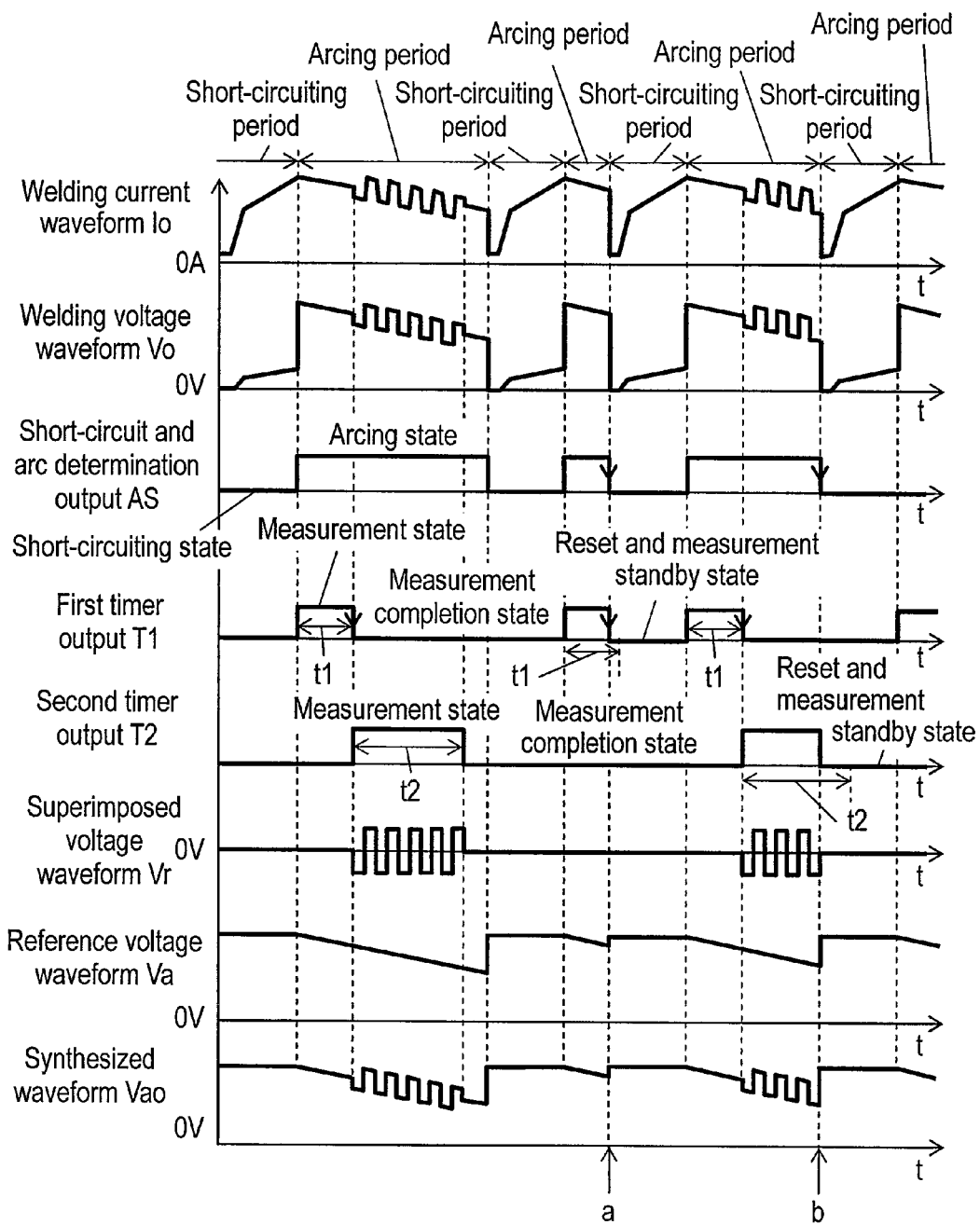
FIG. 2 is a timing chart of an output waveform and operation of each component when a superimposed voltage waveform is a square wave in accordance with the first exemplary embodiment of the present invention.

FIG. 2 is a timing chart illustrating the output waveform and operation of each component when the superimposed voltage waveform is a square wave in this exemplary embodiment.

Next, the operation of the arc welding equipment in this exemplary embodiment is described with reference to FIGS. 1 and 2.

First, welding current detector 5 detects the welding output current, and outputs welding current waveform Io, as shown in FIG. 2, to controller 13. Welding voltage detector 4 detects the welding output voltage, and outputs welding voltage waveform Vo to controller 13 and short-circuit and arc determination unit 6. Short-circuit and arc determination unit 6 then determines, based on the waveform output from welding voltage detector 4, whether the welding state is in the short-circuiting state or the arcing state. Short-circuit and arc determination unit 6 then outputs a waveform as shown by short-circuit and arc determination output AS in FIG. 2. Short-circuit and arc determination unit 6 generates a low-level output, which reports the short-circuiting state during the short-circuiting period, and a high-level output, which reports the arcing state during the arcing period, to first timer 9 and controller 13. Any voltage which can be used for determination is output. For example, the low level is 0 V, and the high level is several volts.

Next, first timer 9 generates a low-level output during the short-circuiting period to report that measurement is in the reset and measurement standby state, as shown by first timer output T1 in FIG. 2, based on the output of short-circuit and arc determination unit 6. Then, triggered by a change in the welding state from the short-circuiting period to the arcing period, first timer 9 generates a high-level output reporting the measurement state in the arcing period. Setting unit 14 stores setting values corresponding to average commanded welding current values or commanded feed rates of the consumable electrode, and sets first predetermined time t1 to first timer 9 in advance. When this first predetermined time t1 elapses, first timer 9 generates the low-level output to report the measurement completion state.

Second timer 10 generates the low-level output during the short-circuiting period to report that measurement is in the reset and measurement standby state, as shown by second timer output T2 in FIG. 2, based on the output of short-circuit and arc determination unit 6 and the output of first timer 9. Triggered by a change in the output of first timer 9 from the measurement state to the measurement completion state, second timer 10 generates the high-level output reporting the measurement state while the output of first timer 9 indicates the measurement completion state. Setting unit 14 stores setting values corresponding to average commanded welding current values or commanded feed rates of the consumable electrode, and sets second predetermined time t2 to second timer 10 in advance. When this second predetermined time t2 elapses, second timer 10 generates the low-level output to report the measurement completion state.

Based on the output of second timer 10, superimposed voltage waveform generator 11 produces superimposed voltage waveform Vr with cycle and amplitude, set in advance by setting unit 14, in a period when second timer 10 is reporting the measurement state. Setting unit 14 stores setting values corresponding to average commanded welding current values or commanded feed rates of the consumable electrode. In other words, the predetermined period within the arcing period is a period when second timer t2 is under measurement. This is the period that second predetermined time t2 elapses after first predetermined time t1 elapses from arc generation. For example, first predetermined time t1 may be set to between 0 ms and 100 ms, and second predetermined time t2 may be set to between 0.01 ms and 1000 MS.

Reference voltage waveform generator 8 generates predetermined reference voltage waveform Va during the arcing period, based on the output of short-circuit and arc determination unit 6. Voltage waveform synthesizer 12 adds and synthesizes superimposed voltage waveform Vr generated by superimposed voltage waveform generator 11 and reference voltage waveform Va generated by reference voltage waveform generator 8. The output of voltage waveform synthesizer 12 is synthesized waveform Vao shown in FIG. 2. As shown in the drawing, synthesized waveform Vao is the same as reference voltage waveform Va when first timer 9 reports the measurement state. While second timer 10 is reporting the measurement state, synthesized waveform Vao becomes a combined waveform of reference voltage waveform Va and superimposed voltage waveform Vr. When second timer 10 completes its measurement, synthesized waveform Vao becomes reference voltage waveform Va.

When the output of short-circuit and arc determination unit 6 reports the short-circuiting period, controller 13 controls the output of welding output unit 3 such that the output of welding current detector 5 and the output of reference current waveform generator 7 match, based on the outputs of welding current generator 5, reference current waveform generator 7, welding voltage detector 4, voltage waveform synthesizer 12, and short-circuit and arc determination unit 6. On the other hand, when the output of short-circuit and arc determination unit 6 determines the arcing period, controller 13 controls the output of welding output unit 3 such that the outputs of welding voltage detector 4 and voltage waveform synthesizer 12 match.

As shown by timing a in FIG. 2, first timer 9 and second timer 10 adopt the reset and measurement standby state when short-circuit and arc determination output AS from short-circuit and arc determination unit 6 falls to a low level reporting the short-circuiting state during measurement by first timer 9. As a result, the output of voltage waveform synthesizer 12 becomes the same as reference voltage waveform Va. As shown by timing b in FIG. 2, second timer 10 adopts the reset and measurement standby state also when short-circuit and arc determination output AS from short-circuit and arc determination unit 6 reports the short-circuiting state during measurement by second timer 10. As a result, the output of voltage waveform synthesizer 12 becomes the same as reference voltage waveform Va.

Figure 3:
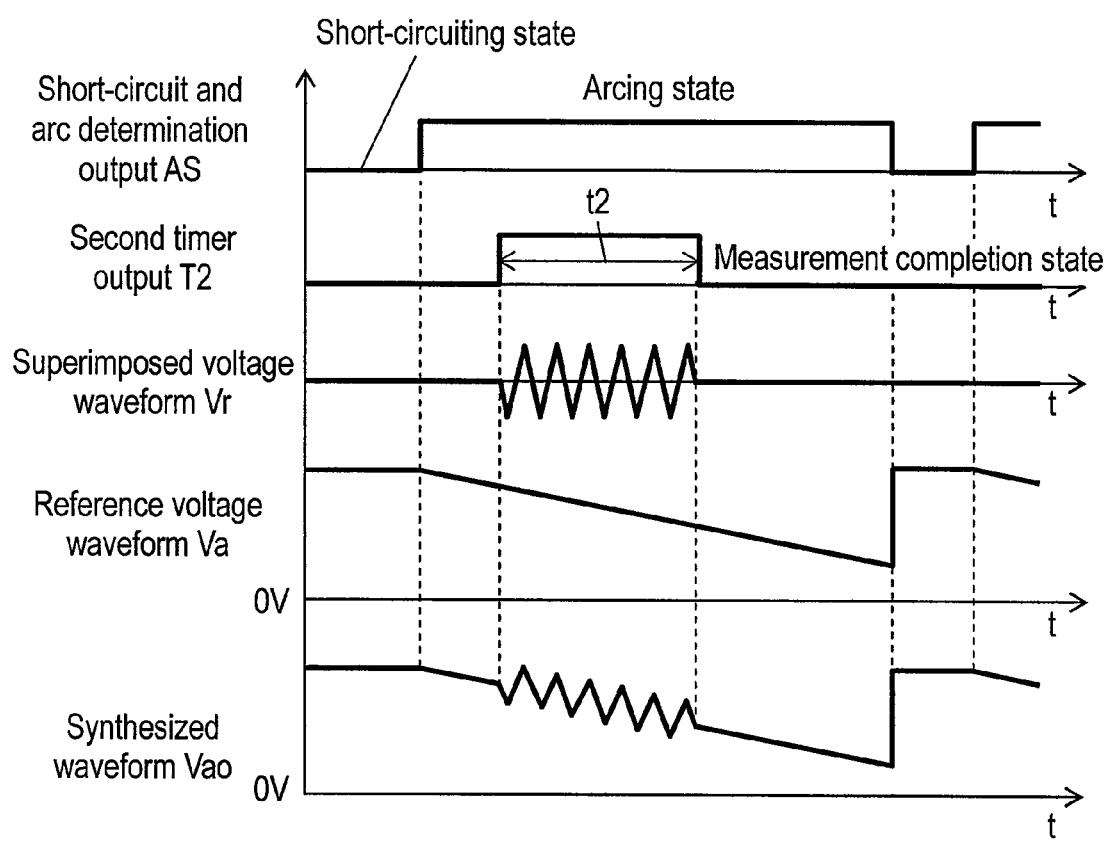
FIG. 3 is a timing chart of an output waveform and operation of each component when the superimposed voltage waveform is a triangle wave in accordance with the first exemplary embodiment of the present invention.
Figure 4:
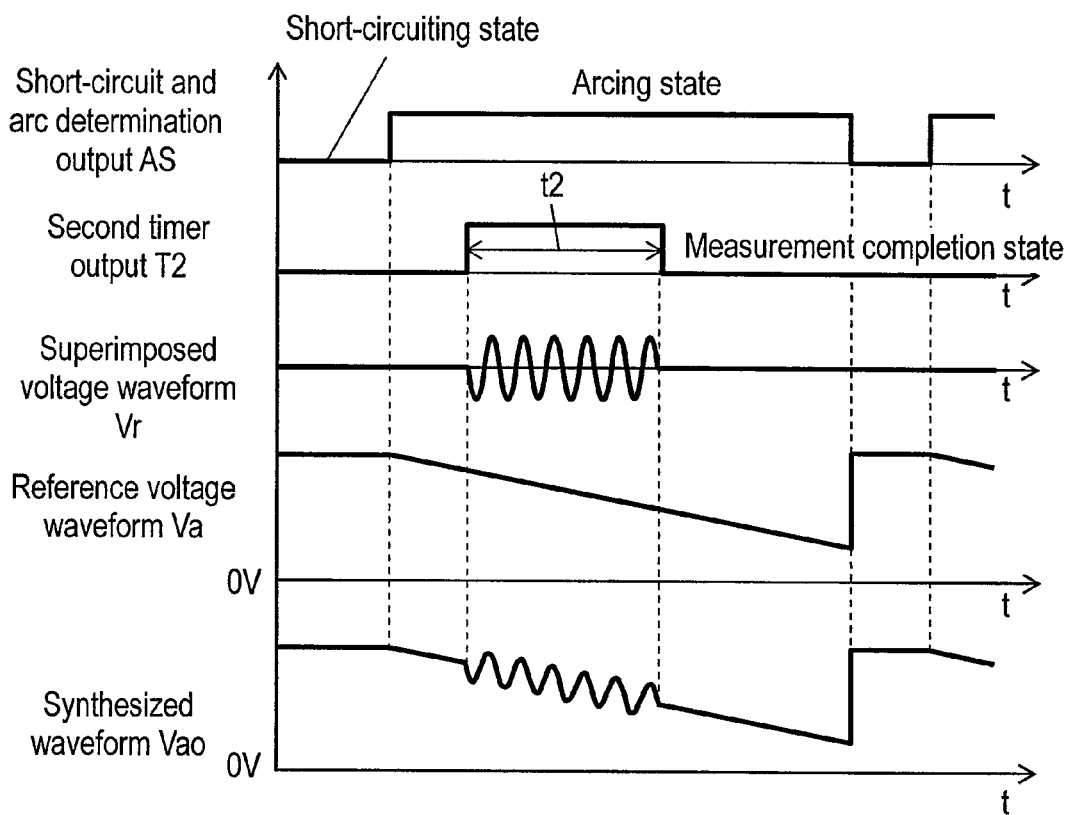
FIG. 4 is a timing chart of an output waveform and operation of each component when the superimposed voltage waveform is a sine wave in accordance with the first exemplary embodiment of the present invention.

In FIG. 2, superimposed voltage waveform Vr is shown as a square wave. However, the use of a triangle wave shown in FIG. 3 or a sine wave shown in FIG. 4 enables suppression of acute change in the arc force by gradually changing the welding voltage. This smoothly vibrates or suppresses weld droplets, achieving the same effect.

Figure 5:
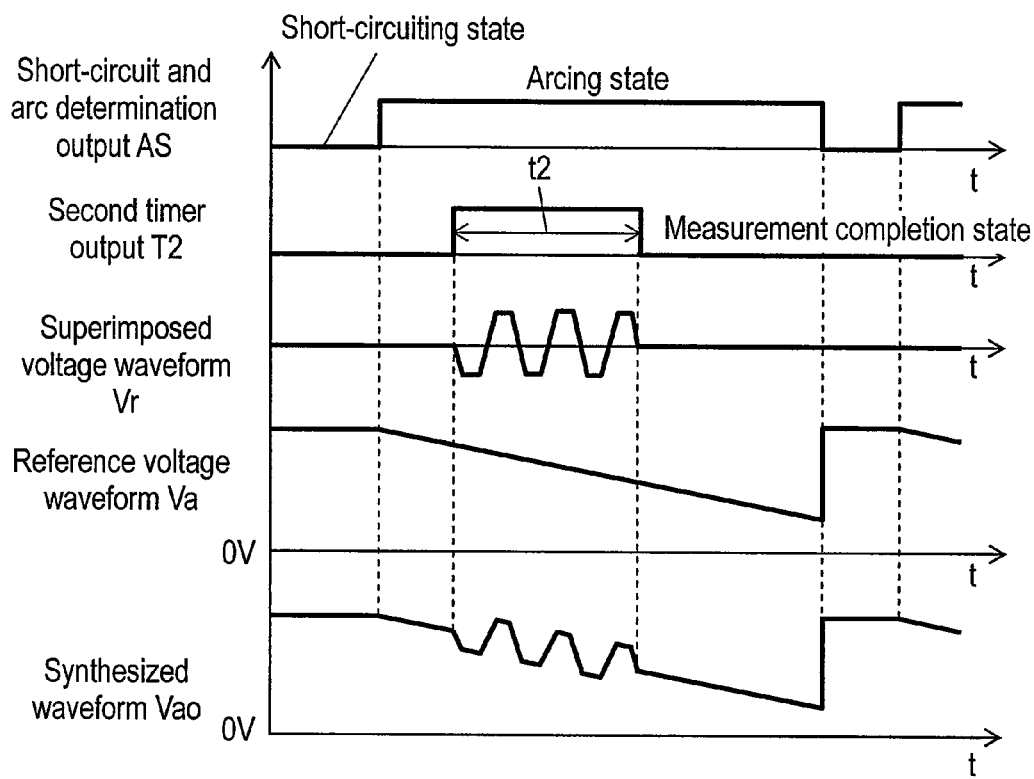
FIG. 5 is a timing chart of an output waveform and operation of each component when the superimposed voltage waveform is a trapezoid repetition waveform in accordance with the first exemplary embodiment of the present invention.
Figure 6A:
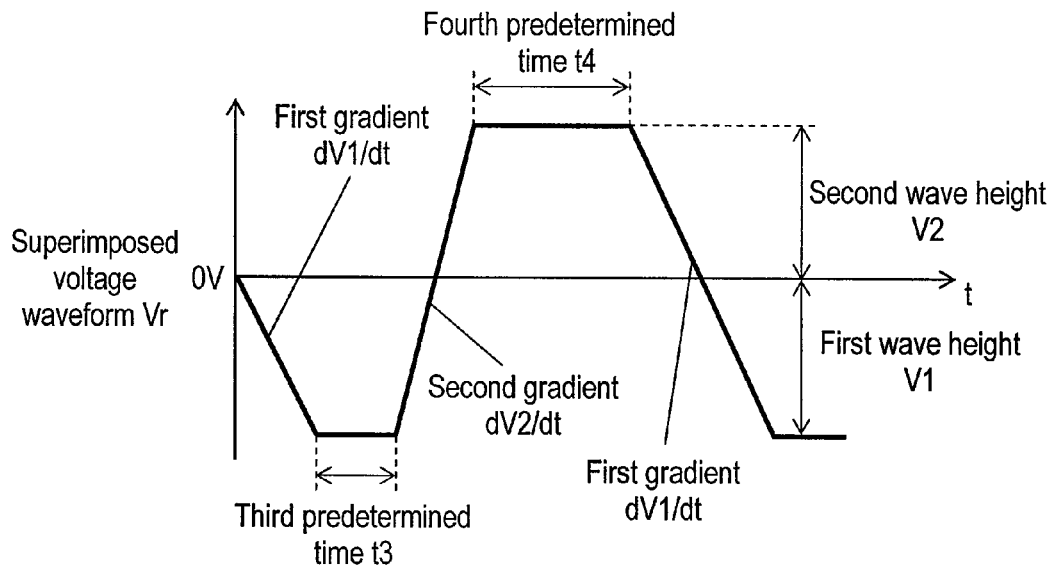
FIG. 6A is a chart detailing the superimposed voltage waveform of FIG. 5.
Figure 6B:
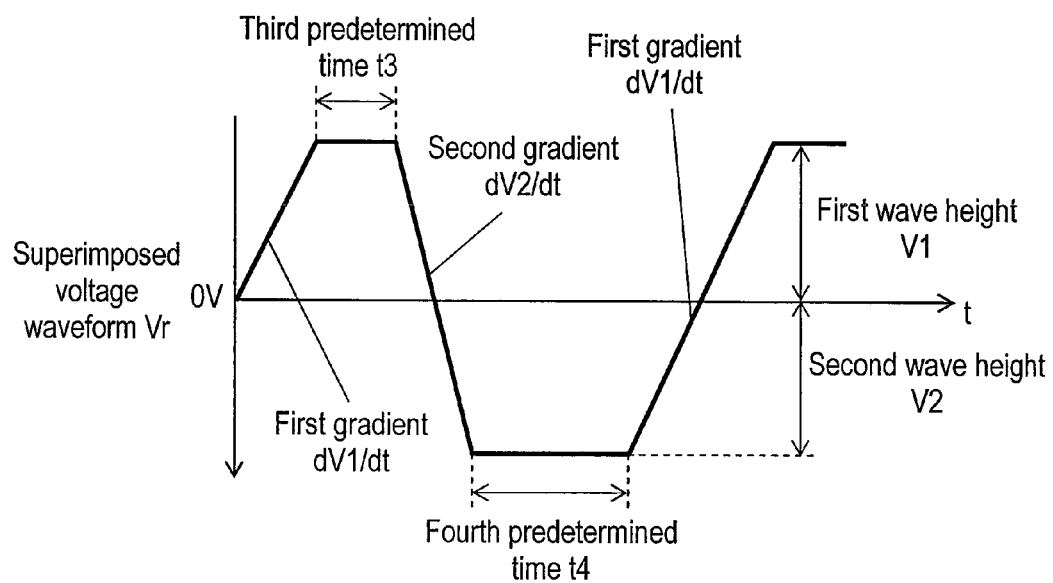
FIG. 6B is a chart detailing another example of superimposed voltage waveform in FIG. 5.
Figure 7:
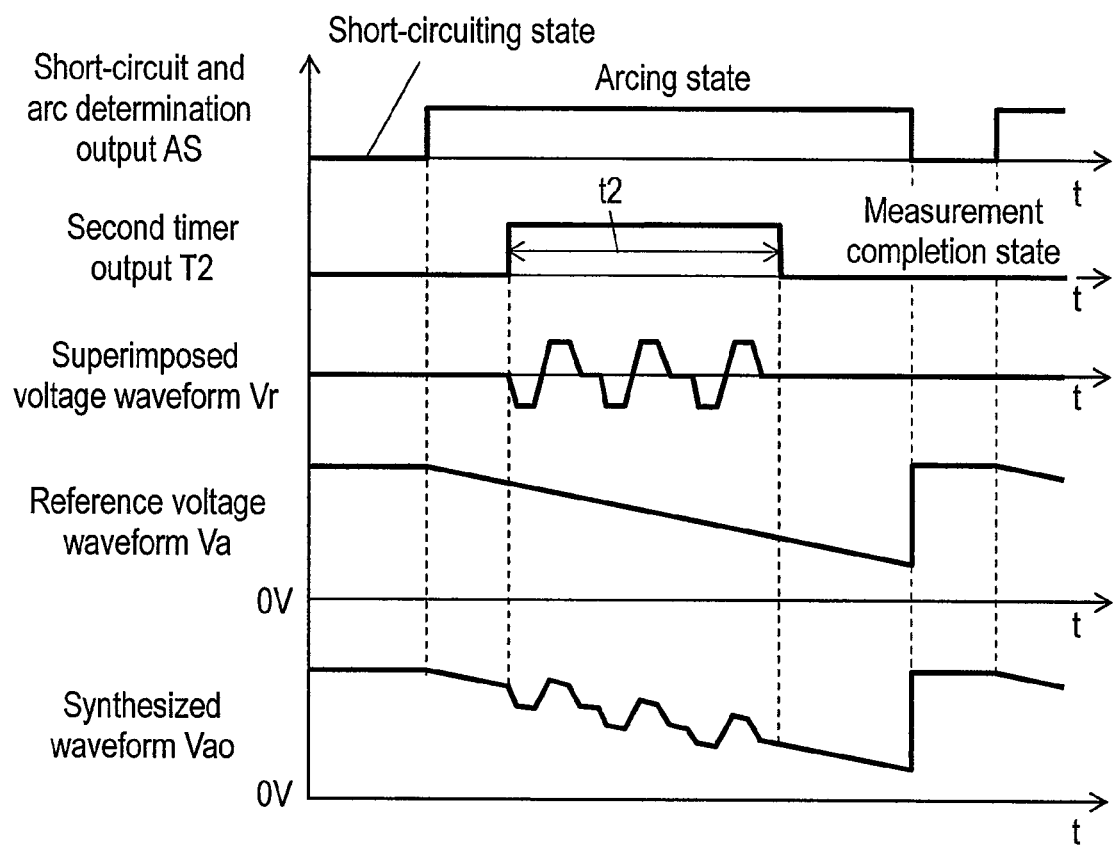
FIG. 7 is a timing chart of an output waveform and operation of each component when the superimposed voltage waveform is a stepped repetition waveform in accordance with the first exemplary embodiment of the present invention.
Figure 8A:
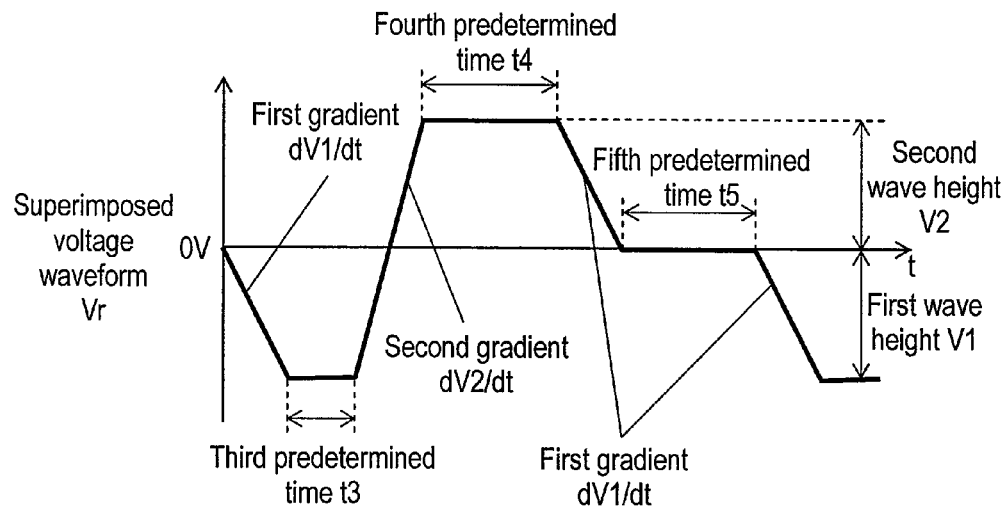
FIG. 8A is a chart detailing the superimposed voltage waveform in FIG. 7.
Figure 8B:
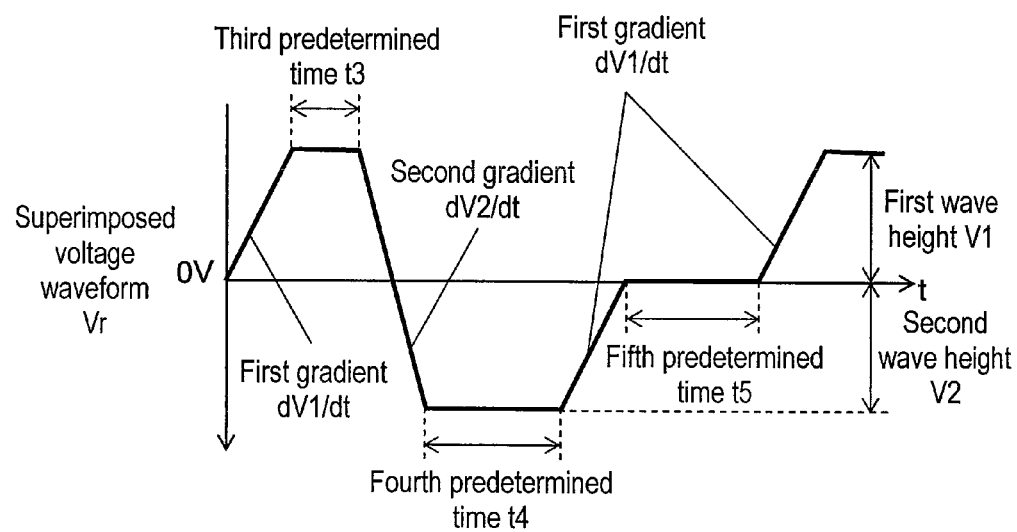
FIG. 8B is a chart detailing another example of superimposed voltage waveform in FIG. 7.

A trapezoid repetition waveform shown in FIGS. 5, 6A, and 6B or a stepped repetition waveform shown in FIGS. 7, 8A, and 8B may also be used for superimposed voltage waveform Vr. The use of the trapezoid repetition waveform shown in FIGS. 6A and 6B achieves the further effects described below.

First, the effect is described with reference to FIG. 6A. The arc force is gradually decreased to first wave height V1 along first gradient $dV1/dt$, which takes into account the force extending the weld droplet downwards by gravity, surface tension, and plasma airflow. Then, vibration of the weld droplet is stabilized during third predetermined time t3. Next, the arc force is gradually increased to second wave height V2 along second gradient $dV2/dt$, which takes into account the force extending the weld droplet downwards by gravity, surface tension, and plasma airflow. Vibration of the weld droplet is stabilized during fourth predetermined time t4. The arc force is then gradually decreased again along first gradient $dV1/dt$.

More specifically, predetermined superimposed voltage waveform Vr is a repetition waveform including a period of decreasing along first gradient $dV1/dt$, a period of maintaining first predetermined wave height V1 for third predetermined time t3 after reaching first predetermined wave height V1, a period of increasing along second gradient $dV2/dt$ after third predetermined time t3 elapses, a period of maintaining second predetermined wave height V2 for fourth predetermined time t4 after reaching second predetermined wave height V2, and a period of decreasing along first gradient $dV1/dt$ after fourth predetermined time t4 elapses. For example, first predetermined wave height V1 is from 0.2 V to 10 V, and second predetermined wave height V2 is from 0.2 V to 10 V. Third predetermined time t3 may be from 0.01 ms to 5 ms, and fourth predetermined time t4 may be from 0.01 ms to 5 ms.

In addition, as shown in FIG. 6B, predetermined superimposed voltage waveform Vr may be a repetition waveform including a period of increasing along first gradient $dV1/dt$, a period of maintaining first predetermined wave height V1 for third predetermined time t3 after reaching first predetermined wave height V1, a period of decreasing along second gradient $dV2/dt$ after third predetermined time t3 elapses, a period of maintaining second predetermined wave height V2 for fourth predetermined time t4 after reaching second predetermined wave height V2, and a period of increasing along first gradient $dV1/dt$ after fourth predetermined time t4 elapses.

By gradually changing the welding voltage in this way, an acute change in the arc force can be suppressed. This smoothly vibrates or suppresses the weld droplet, achieving the same effect. A stepped repetition waveform shown in FIGS. 8A and 8B is given as an example. Other repetition waveforms typically including more number of steps are also applicable. The present invention is thus not limited to this example.

When the arc force is decreased along first gradient $dV1/dt$, as shown in FIGS. 8A and 8B, vibration of the weld droplet can be further suppressed or stabilized by providing fifth predetermined time t5 for stabilizing the weld droplet, achieving the same effects.

More specifically, as shown in FIG. 8A, predetermined superimposed voltage waveform Vr is a repetition waveform including a period of decreasing along first gradient $dV1/dt$, a period of maintaining first predetermined wave height V1 for third predetermined time t3 after reaching first predetermined wave height V1, a period of increasing along second gradient $dV2/dt$ after third predetermined time t3 elapses, a period of maintaining second predetermined wave height V2 for fourth predetermined time t4 after reaching second predetermined wave height V2, a period of decreasing along first gradient $dV1/dt$ after fourth predetermined time t4 elapses, and a period of maintaining wave height 0 for fifth predetermined time t5 after reaching wave height 0 while decreasing along first gradient $dV1/dt$. For example, fifth predetermined time t5 is from 0.01 ms to 5 ms.

Alternatively, predetermined superimposed voltage waveform Vr may be a repetition waveform including a period of increasing along first gradient $dV1/dt$, a period of maintaining first predetermined wave height V1 for third predetermined time t3 after reaching first predetermined wave height V1, a period of decreasing along second gradient $dV2/dt$ after third predetermined time t3 elapses, a period of maintaining second predetermined wave height V2 for fourth predetermined time t4 after reaching second predetermined wave height V2, a period of increasing along first gradient $dV1/dt$ after fourth predetermined time t4 elapses, and a period of maintaining wave height 0 for fifth predetermined time t5 after reaching wave height 0 while increasing along first gradient $dV1/dt$.

In addition, first predetermined time t1, second predetermined t2, and waveform parameters including a cycle, amplitude, and gradient of superimposed voltage waveform Vr may be changed as a function of average commanded welding current values or commanded feed rates of the consumable electrode. In other words, at least one of first predetermined time t1; second predetermined time t2; first gradient $dV1/dt$ and second gradient $dV2/dt$, first predetermined wave height V1 and second predetermined wave height V2 of superimposed voltage waveform; third predetermined time V3; fourth predetermined time V4; fifth predetermined time V5; a cycle and amplitude of one of the sine wave, triangle wave, and square wave of the predetermined superimposed voltage waveform; and a first threshold and a second threshold of the commanded average waveform, may be set corresponding to the average welding current or the feed rate of the consumable electrode.

For example, in a low current range where short-circuits are frequent or the feed rate of the consumable electrode is small, first predetermined time t1 and second predetermined time t2 may be set short because the arcing period is short. Or, since the growth of weld droplet is slow, a cycle of superimposed voltage waveform Vr may be made long and its amplitude may be changed in a small range. In a medium to high current range where short-circuits are less frequent, or the feed rate of consumable electrode is large, first predetermined time t1 and second predetermined time t2 may be set long because the arcing period is long. Since the growth of weld droplet is fast in this case, a cycle of superimposed voltage waveform Vr may be set short, and its amplitude may be changed in a large range.

In this exemplary embodiment, the arc force reduces on reducing the arc voltage during the low-level period of superimposed voltage waveform by superimposing a voltage, which has a cycle shorter than the short-circuit cycle but longer than the control cycle of the welding power supply unit, on the commanded reference welding output voltage for the second predetermined time after the first predetermined time elapses within the arcing period. In other words, the force pushing the weld droplet up toward the consumable electrode is reduced. During the high-level period of superimposed voltage waveform, the arc force increases on increasing the arc voltage. In other words, the force pushing the weld droplet up toward the consumable electrode is increased so as to periodically change the arc force. In this way, the vibration of the weld droplet and weld pool can be suppressed or forcibly generated by relatively balancing the rate at which the weld droplet extend downwards, including the droplet growth rate, the feeding speed of the consumable electrode, and the vibration of the weld droplet and the weld pool.

As described above, in this exemplary embodiment, vibration of the weld droplet and weld pool is suppressed or forcibly generated by superimposing predetermined superimposed voltage waveform Vr on the welding voltage waveform, that is a commanded voltage waveform, during the predetermined period within the arcing period so as to periodically change the arc force. As a result, the growth of weld droplet by being pushed up toward the consumable electrode can be suppressed over the entire range from the low current range, characterized by frequent short-circuits, to the medium to high current range where short-circuits are less frequent.

Further, the weld droplet is smoothly transferred to the weld pool in addition to prevention of excessive growth of the weld droplet. This reduces the generation of spatter, further flattening the bead appearance.

The cycle of superimposed voltage waveform Vr is preferably shorter than the short-circuit cycle but longer than the control cycle of the arc welding equipment. More specifically, the cycle is preferably not less than 100 Hz and not more than 100 kHz. Reasons for setting the cycle shorter than the short-circuit cycle but longer than the control cycle of the arc welding equipment are given below.

One reason for setting the cycle shorter than the short-circuit cycle is because the arc force does not change during the arcing period if the cycle is longer than the short-circuit cycle. For example, in a range where the average welding current is 120 A, short-circuiting generally occurs about 80 to 120 times per second, with the short-circuiting period in this range being about 5 to 10 ms. In this case, to change the arc force, the cycle of superimposed voltage waveform needs to be set to at least 10 ms or less, i.e., 100 Hz or greater. If the cycle is longer, the next short-circuit occurs before changing the arc force.

A reason for setting the cycle longer than the control cycle of the arc welding equipment is that the arc welding equipment sets the welding output in each case, depending on the control frequency of the power supply. Accordingly, the arc welding equipment cannot respond faster than this control frequency. If the control frequency is 100 kHz, the welding output changes every 10 μs. Therefore, even if the cycle of superimposed voltage waveform Vr is set to 9 μs, the welding output does not change.

First predetermined time t1 may be set to 0. In other words, superimposed voltage waveform Vr may be superimposed on reference voltage waveform Va immediately after entering the arcing period. Alternatively, superimposed voltage waveform Vr may be superimposed on reference voltage waveform Va some time after entering the arcing period.

In the case of an abnormally long arcing period, the weld droplet is likely to grow large. If the arc force is forcibly increased using the superimposed voltage, the weld droplet may be blown off when the arc force is strong, generating a large spatter droplet. It is thus preferable not to superimpose voltage waveform Vr immediately before the end of the arcing period.

Second Exemplary Embodiment

Figure 9:
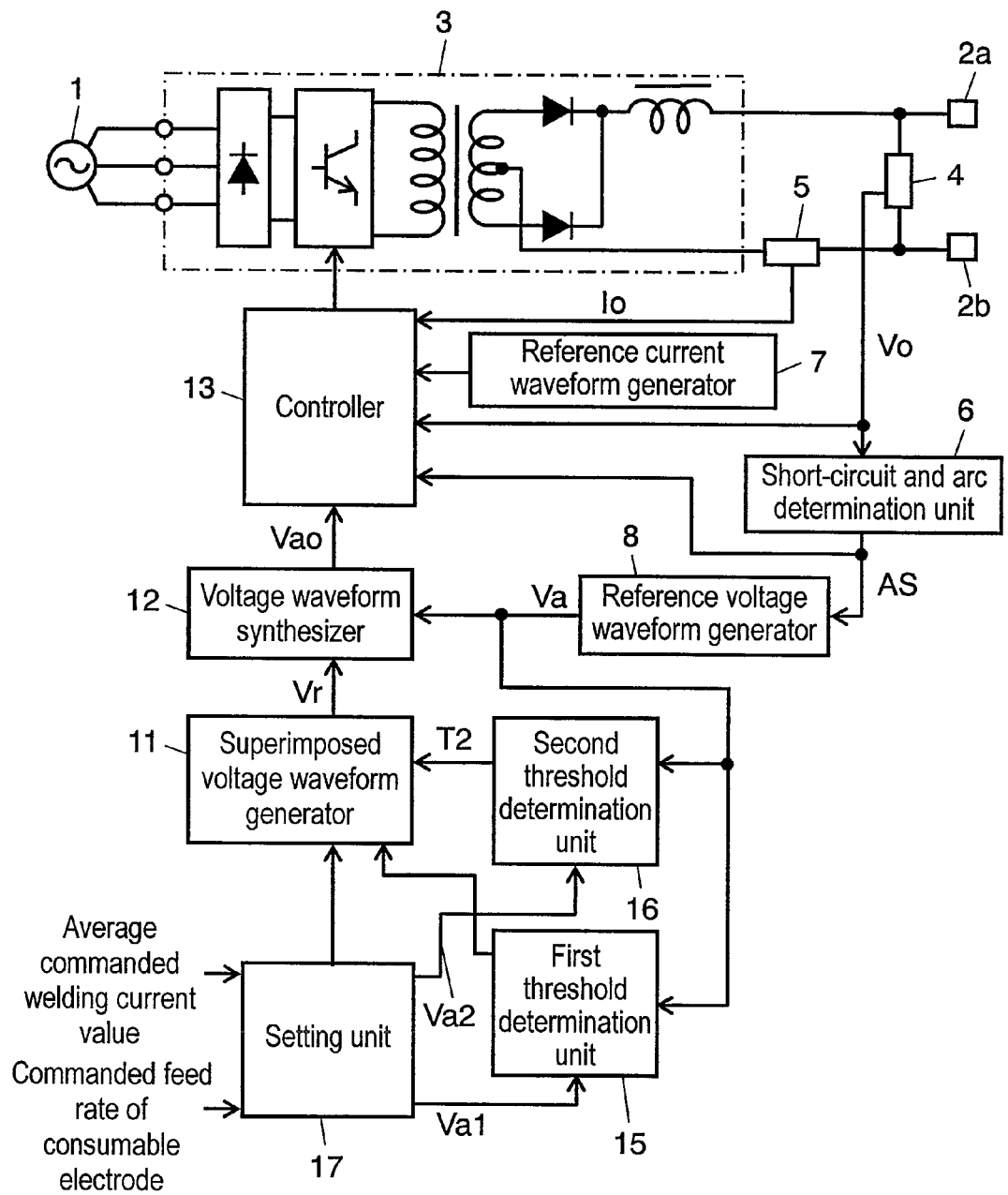
FIG. 9 is a block diagram illustrating a configuration of arc welding equipment in accordance with a second exemplary embodiment of the present invention.
Figure 10:
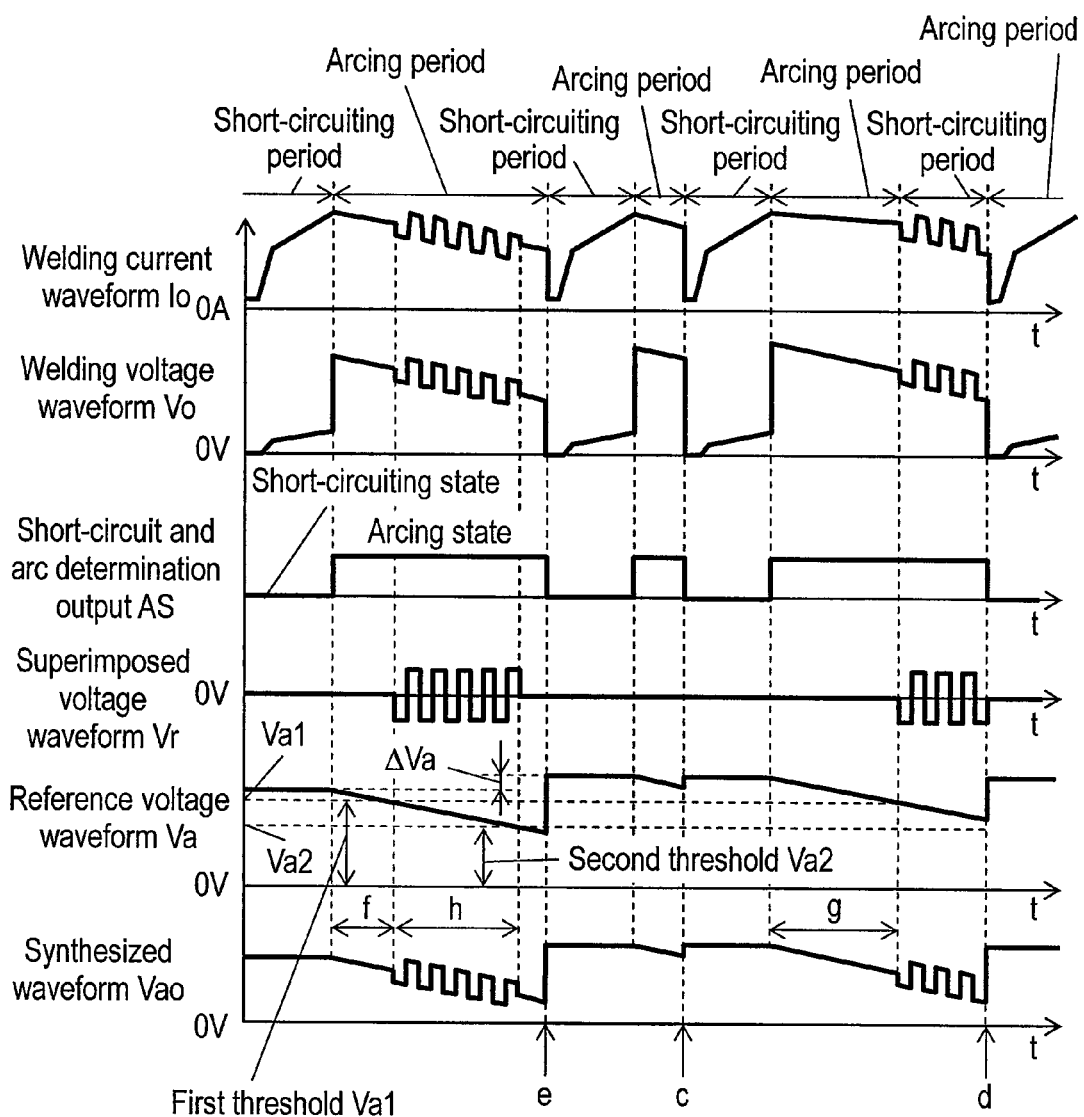
FIG. 10 is a timing chart of an output waveform and operation of each component when a superimposed voltage waveform is a square wave in accordance with the second exemplary embodiment of the present invention.

FIG. 9 is a block diagram illustrating a configuration of arc welding equipment in the second exemplary embodiment. FIG. 10 is a timing chart of an output waveform and operation of each component shown in FIG. 9 in this exemplary embodiment.

A major difference between the second exemplary embodiment and the first exemplary embodiment is that a predetermined period for applying superimposed voltage waveform Vr to reference voltage waveform Va is determined based on a value of reference voltage waveform Va instead of a time after entering the arcing period. Same reference marks are given to components same as those in the first exemplary embodiment to omit duplicate description. The second exemplary embodiment is described next, centering on points different from that of the first exemplary embodiment, with reference to FIGS. 9 and 10.

As shown in FIG. 9, the arc welding equipment in this exemplary embodiment includes setting unit 17 for storing and setting a first threshold, a second threshold, and a periodic waveform of superimposed voltage waveform Vr corresponding to average commanded welding current values or commanded feed rates of the consumable electrode. The arc welding equipment also includes first threshold determination unit 15 for determining whether or not the reference voltage waveform is not greater than the first threshold, based on outputs of reference voltage waveform generator 8 and setting unit 17, and second threshold determination unit 16 for determining whether or not the reference voltage waveform is not greater than the second threshold, based on outputs of reference voltage waveform generator 8 and setting unit 17.

Next, the operation of the arc welding equipment in this exemplary embodiment is described with reference to FIGS. 9 and 10.

First. welding current detector 5 detects the welding output current, and outputs welding current waveform Io to controller 13. Welding voltage detector 4 detects the welding output voltage, and outputs welding voltage waveform Vo to controller 13 and short-circuit and arc determination unit 6. Short-circuit and arc determination unit 6 determines whether a welding state is in a short-circuiting state or arcing state, based on a waveform output from welding voltage detector 4, and outputs the short-circuiting period or arcing period. This output is shown as short-circuit and arc determination output AS in FIG. 10. Reference voltage waveform generator 8 generates reference voltage waveform Va, set in advance, during the arcing period based on an output of short-circuit and arc determination unit 6.

Next, first threshold determination unit 15 determines whether or not reference voltage waveform Va is not greater than first threshold Va1 set in advance by setting unit 17, based on the outputs of reference voltage waveform generator 8 and setting unit 17, and outputs an signal to superimposed voltage waveform generator 11. Setting unit 17 stores setting values corresponding to commanded average welding current values or commanded feed rates of the consumable electrode. Then, second threshold determination unit 16 determines whether or not reference voltage waveform Va is not greater than second threshold Vat, set in advance by setting unit 17, based on the outputs of reference voltage waveform generator 8 and setting unit 17, and outputs a signal to superimposed voltage waveform generator 11. Setting unit 17 stores setting values corresponding to average commanded welding current values or commanded feed rates of the consumable electrode.

Superimposed voltage waveform generator 11 generates and outputs superimposed voltage waveform Vr, that is a commanded voltage waveform, based on the outputs of first threshold determination unit 15 and second threshold determination unit 16. In other words, superimposed voltage waveform Vr with a cycle and amplitude set in advance by setting unit 17 is generated and output during a period when reference voltage waveform Va is between first threshold Va1 and second threshold Va2. Setting unit 17 stores setting values corresponding to average commanded welding current values or commanded feed rates of the consumable electrode. As described above, a predetermined period within the arcing period is a period when the commanded voltage waveform changes from first threshold Va1 to second threshold Va2. For example, first threshold Va1 is between 35V and 25V, and second threshold Va2 is between 35 V and 15 V.

Voltage waveform synthesizer 12 adds and synthesizes superimposed voltage waveform Vr generated by superimposed voltage waveform generator 11 and reference voltage waveform Va generated by reference voltage waveform generator 8. An output of this voltage waveform synthesizer 12 is shown as synthesized waveform Vao in FIG. 10. As shown in the drawing, synthesized waveform Vao is the same as reference voltage waveform Va when reference voltage waveform Va is not less than first threshold Va1. When reference voltage waveform Va is between first threshold Va1 and second threshold Va2, synthesized waveform Vao becomes a combined waveform of reference voltage waveform Va and superimposed voltage waveform Vr. When reference voltage waveform Va is not greater than first threshold Va1, synthesized waveform Vao becomes the same as reference voltage waveform Va.

When the output of short-circuit and arc determination unit 6 reports the short-circuiting period, controller 13 controls the output of welding output unit 3 such that the outputs of welding current detector 5 and reference current waveform generator 7 match, based on the outputs of welding current detector 5, reference current waveform generator 7, welding voltage detector 4, voltage waveform synthesizer 12, and short-circuit and arc determination unit 6. On the other hand, when the output of short-circuit and arc determination unit 6 determines the arcing period, controller 13 controls the output of welding output unit 3 such that outputs of welding voltage detector 4 and voltage waveform synthesizer 12 match.

To finely adjust the voltage for changing the bead shape and arc length, period f and period g in which first threshold determination unit 15 determines that the value is not less than first threshold Va1 also change by increasing, for example, ΔVa at timing e in FIG. 10 so as to change reference voltage waveform Va. As a result, a period for starting superimposed voltage waveform Vr changes. When the arc voltage is high, that is a long arc length, the time period until superimposed voltage waveform Vr is superimposed becomes long. On the other hand, when the arc voltage is low, that is a short arc length, the time period until superimposed voltage waveform Vr is superimposed becomes short. In this way, the time period until applying superimposed voltage waveform Vr can be appropriately adjusted corresponding to the reference voltage waveform.

Period h during which superimposed voltage is superimposed, as shown in FIG. 10, can be changed by changing first threshold Va1 in addition to changing reference voltage waveform Va. As a result, when the arc voltage is high, that is the long arc length, the time period for applying the superimposing voltage waveform Vr becomes long. On the other hand, when the arc voltage is low, that is the short arc length, the time period for applying superimposed voltage waveform Vr becomes short. In this way, the time for superimposing voltage waveform Vr can be appropriately adjusted corresponding to reference voltage waveform Va.

As shown by timing c in FIG. 10, superimposed voltage waveform generator 11 does not generate superimposed voltage waveform Vr when the output of short-circuit and arc determination unit 6 reports the short-circuiting state during the period when reference voltage waveform Va is not less than first threshold Va1. Accordingly, voltage waveform synthesizer 12 outputs reference voltage waveform Va. In addition, as shown by timing d in FIG. 10, superimposed voltage waveform generator 11 does not generate superimposed voltage waveform Vr also when the output of short-circuit and arc determination unit 6 reports the short-circuiting state during the period when reference voltage waveform Va is between first threshold Va1 and second threshold Vat. Accordingly, voltage waveform synthesizer 12 outputs reference voltage waveform Va.

In the present invention, as described above, vibration of the weld droplet and weld pool is suppressed or forcibly generated by superimposing predetermined superimposed voltage waveform Vr on the welding output voltage, during the predetermined period within the arcing period, so as to periodically change the arc force. As a result, the growth of weld droplet by being pushed up toward the consumable electrode can be suppressed over the entire range from the low current range, characterized by frequent short-circuits, to the medium to high current range where short-circuits are less frequent. Further, the weld droplet is smoothly transferred to the weld pool in addition to prevention of excessive growth of the weld droplet. This reduces the generation of spatter, further flattening the bead appearance The time period for applying superimposed voltage waveform Vr can be changed, corresponding to average commanded welding voltage values, by setting the predetermined period within the arcing period using a value of reference voltage waveform Va. This enables application of appropriate superimposed voltage waveform Vr.

INDUSTRIAL APPLICABILITY

The arc welding power supply unit and its welding output control method reduces generation of spatter over the entire range from the low current range, characterized by frequent short-circuits, to the medium to high current range where short-circuits are less frequent; and also flattens the bead appearance. Accordingly, the present invention is effectively applicable to the welding field.

The invention claimed is:

1. A welding output control method for arc welding using a consumable electrode, the method comprising:
feeding the consumable electrode to a welding workpiece; and
supplying power between the consumable electrode and the welding workpiece by a welding power supply unit so as to alternate between a short-circuiting period during which a short-circuit takes place between the consumable electrode and the welding workpiece and an arcing period during which an electric arc is formed between the consumable electrode and the welding workpiece;
wherein
a commanded voltage is supplied between the consumable electrode and the workpiece during each arcing period so that the commanded voltage continuously decreases over time, from a first short-circuiting period before the arcing period to a second short-circuiting period after the arcing period, and
a predetermined superimposed voltage waveform is superimposed on the commanded voltage waveform during a predetermined period within the arcing period, the superimposed voltage waveform being shorter than a short-circuit cycle and longer than a control cycle of the welding power supply unit.

2. The welding output control method of claim 1, wherein the predetermined period within the arcing period is a period until a second predetermined time elapses after a first predetermined time elapses from arc generation.

3. The welding output control method of claim 1, wherein the predetermined period within the arcing period is a period in which the commanded voltage waveform changes from a first threshold to a second threshold.

4. The welding output control method of claim 1, wherein the predetermined superimposed voltage waveform is a repetition waveform comprising:
a period of decreasing along a first gradient;
a period of maintaining a first predetermined wave height for a third predetermined time after reaching the first predetermined wave height;

a period of increasing along a second gradient after the third predetermined time elapses;
a period of maintaining a second predetermined wave height for a fourth predetermined time after reaching the second predetermined wave height; and
a period of decreasing along the first gradient after the fourth predetermined time elapses.

5. The welding output control method of claim 1, wherein the predetermined superimposed voltage waveform is a repetition waveform comprising:
a period of increasing along a first gradient;
a period of maintaining a first predetermined wave height for a third predetermined time after reaching the first predetermined wave height;
a period of decreasing along a second gradient after the third predetermined time elapses;
a period of maintaining a second predetermined wave height for a fourth predetermined time after reaching the second predetermined wave height; and
a period of increasing along the first gradient after the fourth predetermined time elapses.

6. The welding output control method of claim 1, wherein the predetermined superimposed voltage waveform is a repetition waveform comprising:
a period of decreasing along a first gradient;
a period of maintaining a first predetermined wave height for a third predetermined time after reaching the first predetermined wave height;
a period of increasing along a second gradient after the third predetermined time elapses;
a period of maintaining a second predetermined wave height for a fourth predetermined time after reaching the second predetermined wave height;
a period of decreasing along the first gradient after the fourth predetermined time elapses; and
a period of maintaining a wave height of 0 for a fifth predetermined time after reaching the wave height of 0 while decreasing along the first gradient.

7. The welding output control method of claim 1, wherein the predetermined superimposed voltage waveform is a repetition waveform comprising:
a period of increasing along a first gradient;
a period of maintaining a first predetermined wave height for a third predetermined time after reaching the first predetermined wave height;
a period of decreasing along a second gradient after the third predetermined time elapses;
a period of maintaining a second predetermined wave height for a fourth predetermined time after reaching the second predetermined wave height;
a period of increasing along the first gradient after the fourth predetermined time elapses; and
a period of maintaining a wave height of 0 for a fifth predetermined time after reaching the wave height of 0 while increasing along the first gradient.

8. The welding output control method of claim 1, wherein the predetermined superimposed voltage waveform is one of a sine wave, a triangle wave, and a square wave.

9. The welding output control method of claim 6, wherein a value is set corresponding to one of an average welding current and a feed rate of the consumable electrode, the value being at least one of:
a first predetermined time and a second predetermined time;
the first gradient and the second gradient of the predetermined superimposed voltage waveform;
the first predetermined wave height and the second predetermined wave height;
the third predetermined time, the fourth predetermined time, and the fifth predetermined time;
a cycle and amplitude of one of a sine wave, a triangle wave, and a square wave of the predetermined superimposed voltage waveform; and
a first threshold and a second threshold of the commanded voltage waveform.

10. The welding output control method of claim 1, wherein a cycle of the predetermined superimposed voltage waveform is not less than 100 Hz and not more than 100 kHz.

11. An arc welding equipment, which feeds a consumable electrode and alternates between a short-circuiting period during which a short-circuit takes place between the consumable electrode and a welding workpiece and an arcing period during which an electric arc is formed between the consumable electrode and the welding workpiece, for arc welding using the consumable electrode, the arc welding equipment comprising:
a welding voltage detector for detecting a welding output voltage and outputting a welding voltage waveform;
a reference voltage waveform generator for generating a reference voltage waveform during the arcing period, the reference voltage generator generating the reference voltage so that the reference voltage continuously decreases over time, from a first short-circuiting period before the arcing period to a second short-circuiting period after the arcing period;
a short-circuit and arc determination unit for determining whether a process is in the short-circuiting period or arcing period, based on the welding voltage waveform;
a first timer for measuring a first predetermined time after the short-circuit and arc determination unit determines the arcing period;
a second timer for measuring a second predetermined time after the first timer completes its measurement;
a superimposed voltage waveform generator for generating and outputting a predetermined superimposed voltage waveform when the second timer reports a measurement state;
a voltage waveform synthesizer for synthesizing the reference voltage waveform and the predetermined superimposed voltage waveform; and outputting a synthesized signal; and
a controller for controlling a welding output based on the synthesized signal and the welding voltage waveform.

12. An arc welding equipment, which feeds a consumable electrode and alternates between a short-circuiting period during which a short-circuit takes place between the consumable electrode and a welding workpiece and an arcing period during which an electric arc is formed between the consumable electrode and the welding workpiece, for arc welding using the consumable electrode, the arc welding equipment comprising:
a welding voltage detector for detecting a welding output voltage and outputting a welding voltage waveform;
a reference voltage waveform generator for generating a reference voltage waveform during the arcing period, the reference voltage generator generating the reference voltage so that the reference voltage continuously decreases over time, from a first short-circuiting period before the arcing period to a second short-circuiting period after the arcing period;
a short-circuit and arc determination unit for determining whether a process is in the short-circuiting period or the arcing period, based on the welding voltage waveform;

a first threshold determination unit for determining whether or not a voltage of the reference voltage waveform is not greater than a first threshold;

a second threshold determination unit for determining whether or not the voltage of the reference voltage waveform is not greater than a second threshold;

a superimposed voltage waveform generator for generating and outputting a predetermined superimposed voltage waveform when the voltage of the reference voltage waveform is between the first threshold and the second threshold after the short-circuit and arc determination unit determines the arcing period;

a voltage waveform synthesizer for synthesizing the reference voltage waveform and the superimposed voltage waveform and outputting a synthesized signal; and a controller for controlling welding output based on the synthesized signal and the welding voltage waveform.

13. The arc welding equipment of claim 11, wherein the predetermined superimposed voltage waveform is a repetition waveform comprising:
a period of decreasing along a first gradient;
a period of maintaining a first predetermined wave height for a third predetermined time after reaching the first predetermined wave height;
a period of increasing along a second gradient after the third predetermined time elapses;
a period of maintaining a second predetermined wave height for a fourth predetermined time after reaching the second predetermined wave height; and
a period of decreasing along the first gradient after the fourth predetermined time elapses.

14. The arc welding equipment of claim 11, wherein the predetermined superimposed voltage waveform is a repetition waveform comprising:
a period of increasing along a first gradient;
a period of maintaining a first predetermined wave height for a third predetermined time after reaching the first predetermined wave height;
a period of decreasing along a second gradient after the third predetermined time elapses;
a period of maintaining a second predetermined wave height for a fourth predetermined time after reaching the second predetermined wave height; and
a period of increasing along the first gradient after the fourth predetermined time elapses.

15. The arc welding equipment of claim 11, wherein the predetermined superimposed voltage waveform is a repetition waveform comprising:
a period of decreasing along a first gradient;
a period of maintaining a first predetermined wave height for a third predetermined time after reaching the first predetermined wave height;
a period of increasing along a second gradient after the third predetermined time elapses;
a period of maintaining a second predetermined wave height for a fourth predetermined time after reaching the second predetermined wave height;
a period of decreasing along the first gradient after the fourth predetermined time elapses; and
a period of maintaining a wave height of 0 for a fifth predetermined time after reaching the wave height of 0 while decreasing along the first gradient.

16. The arc welding equipment of claim 11, wherein the predetermined superimposed voltage waveform is a repetition waveform comprising:
a period of increasing along a first gradient;
a period of maintaining a first predetermined wave height for a third predetermined time after reaching the first predetermined wave height;
a period of decreasing along a second gradient after the third predetermined time elapses;
a period of maintaining a second predetermined wave height for a fourth predetermined time after reaching the second predetermined wave height;
a period of increasing along the first gradient after the fourth predetermined time elapses; and
a period of maintaining a wave height of 0 for a fifth predetermined time after reaching the wave height of 0 while increasing along the first gradient.

17. The arc welding equipment of claim 11, wherein the predetermined superimposed voltage waveform is one of a sine wave, a triangle wave, and a square wave.

18. The arc welding equipment of claim 16 comprising a setting unit for setting a value corresponding to one of an average welding current and a feed rate of the consumable electrode, the value being at least one of:
the first predetermined time and the second predetermined time;
the first gradient and the second gradient of the predetermined superimposed voltage waveform;
the first predetermined wave height and the second predetermined wave height;
the third predetermined time, the fourth predetermined time, and the fifth predetermined time;
a cycle and amplitude of one of a sine wave, triangle wave and a square wave of the predetermined superimposed voltage waveform; and
a first threshold and a second threshold of the reference voltage waveform.

19. The arc welding equipment of claim 11, wherein a cycle of the predetermined superimposed voltage waveform is not less than 100 Hz and not more than 100 kHz.

* * * * *